March 15, 1966  A. EULGEM ETAL  3,240,849
METHOD OF MANUFACTURING PLASTIC MATERIAL
HAVING AN IRIDESCENT COLOR EFFECT
Filed Sept. 12, 1962
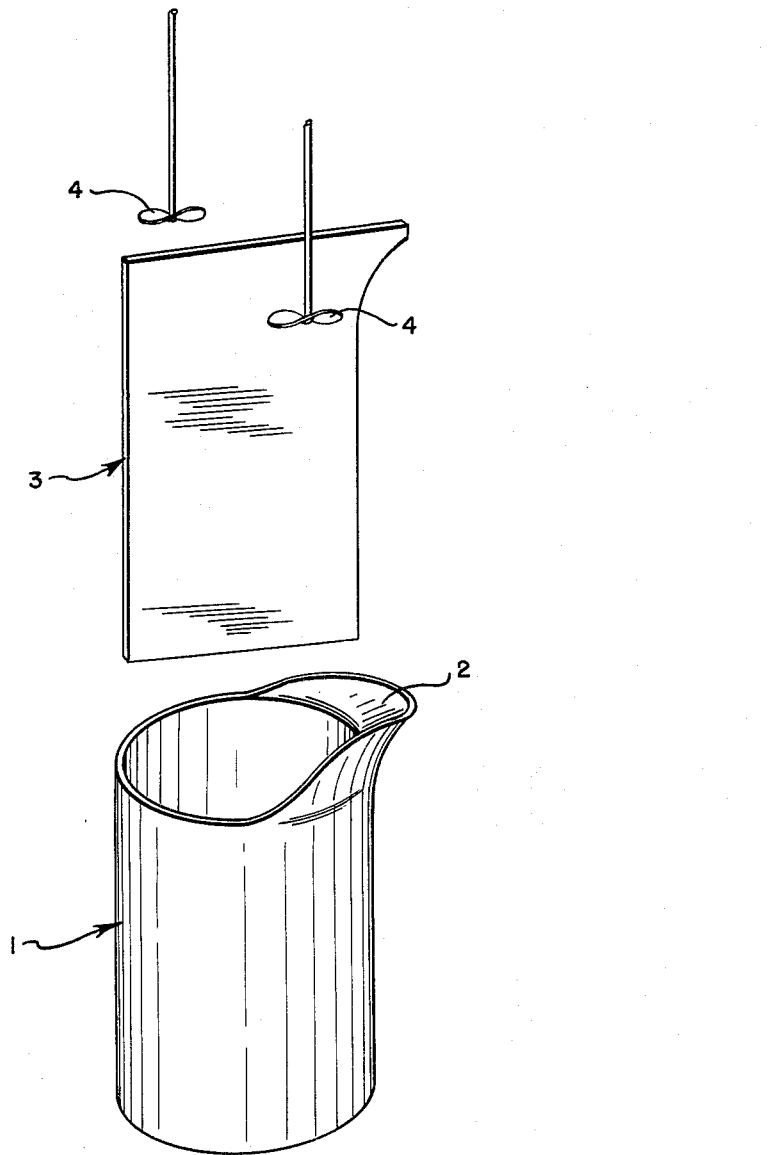
INVENTORS
ALOIS EULGEM
RUDOLF WOINKE
BY
ATTORNEYS

United States Patent Office 3,240,849
Patented Mar. 15, 1966

3,240,849
METHOD OF MANUFACTURING PLASTIC MATERIAL HAVING AN IRIDESCENT COLOR EFFECT
Alois Eulgem and Rudolf Woinke, Mannheim, Germany, assignors, by mesne assignments, to Patrician Plastic Corp., a corporation of Maine
Filed Sept. 12, 1962, Ser. No. 223,274
4 Claims. (Cl. 264—108)

This invention relates to a method for the production of pearly plastic material, preferably in sheet form, having an iridescent effect and suited for the fabrication of buttons and other ornamental articles.

The production of plastic material exhibiting a uniform or mottled nacreous effect, but lacking the play of color characteristic of mother-of-pearl, is known to the art. For example, a method of manufacturing such single-color pearl-like plastics is shown in the U.S. patent to Gerson and Bruins, No. 2,856,635, the method comprising the adding of pearl essence to an unsaturated liquid polyester resin containing a catalyst promoter, stirring, adding a catalyst with continued stirring until uniformly mixed, charging the mixture to a drum rotating about its horizontal axis, and polymerizing the resin in the rotating drum until it has set to the self-coherent state. However, articles made from material produced in this manner do not exhibit the iridescent color effects of genuine mother-of-pearl.

Synthetic nacreous pigments are well known which have dual intrinsic colors. When one of these pigments is incorporated in a transparent, unsaturated polyester by the above-described method, a sheet material is obtained which when viewed by reflected light appears red, for example, but which when viewed by transmitted light appears green. Thus, a two-color effect superior to that of a single pearlescent color is obtained. These effects, however, are of limited utility and value; in nacreous materials which are required for buttons and similar ornamental articles, the color which is apparent in transmitted light is lost, and thus only the reflected color tone is observed. Single color effects have also been achieved heretofore by fabricators of imitation-pearl button materials by incorporating the desired color in the liquid resin mix, or by dyeing the buttons or blanks after they are manufactured. However, none of the expedients resorted to in the past has permitted an iridescent color effect of natural mother-of-pearl to be approached, much less equalled.

The present invention comprises a method of manufacturing pearly plastic material having an iridescent color effect closely equalling that of natural mother-of-pearl. We have discovered a method of duplicating in plastic materials the layer upon layer formation characteristic of natural mother-of-pearl and containing random alternation of the iridescent colors. This is effected by blending a polymerizable liquid synthetic resin having a controllable gel time with a polymerization catalyst, agitating the mixture until the polymerization reaction is initiated as indicated by a rise in temperature of the resin mixture, and then dividing the resulting fluid mixture into a plurality of equal portions. A single colored pearlescent pigment of different color is admixed with each separate portion, the individual pigment-containing portions are briefly agitated, and then the individual pigment-containing portions are separately but simultaneously poured into axially spaced portions of a rotating drum while advancing the pouring location from one end of the drum toward the other. The pouring is repeated at least once again to form another layer in which the portions of one color are substantially superimposed over the portions of the other color in the previously poured layer. Polymerization of the resin is effected while continuing rotation of the drum until the resin has set to a self-coherent state, and then the resulting sheet of pigmented resin is removed from the drum.

Suitable apparatus for mixing and pouring the resin pursuant to the invention is shown in the drawing which consists of an exploded perspective view of the mixing and pouring vessel with its removable partition and mixers.

The method of our invention is applicable to all resins having a controllable gel time, whether thermoplastic or thermosetting. However, if the iridescent material produced by our method is to be used as button stock, thermoplastic resins are of limited utility because they do not withstand the heat of ironing or the solvent action of dry cleaning fluids. Accordingly, thermosetting resins are preferred for use in our method, and any controllable gel time thermosetting resin such as the polyester, epoxy resins and vinyl thermosetting plastisol resins may be used.

Any colored pearlescent pigment, including the white variety, may be used in practicing our invention. Particularly effective colored pearlescent pigments are those commercially available from the Mearl Corporation of New York, N.Y., in the following colors in reflected light:

Murano Color BA—Gold
Murano Color BD—Red
Murano Color BF—Blue
Murano Color BH—Green Mixing of two or more of colored pearlescent pigments will cause the color effects to diminish and in some combinations will neutralize the color entirely. Accordingly, only a single colored pearlescent pigment is used in each of the individual resin portions poured simultaneously into the rotating drum. However, other conventional pigments and colorants may be used in conjunction with each colored pearlescent pigmented portion of the resin with advantageous color effects without adversely affecting the function of the pearlescent material.

The control of the casting process, whereby these random alternations of iridescent oriented pearly pigmented plastic layers are achieved pursuant to the present invention, is based upon the following principles:

(a) The cast films of liquid resins containing different pigments, while blending at their interfaces, must otherwise retain their original pigmentation.

(b) The gel time of each resin portion containing different pigmentation must be substantially identical.

(c) Gelling should occur soon after the casting is complete.

(d) Orientation of the pigment in each layer should be in places substantially parallel to the surfaces of the cast sheet, with, however, moderate departures from these planes when a textured or mottled effect is to be obtained.

These principles are applied by the following techniques:

(a) A master batch of polymerizable liquid resin having a controllable gel time is prepared containing any conventional catalyst promoter, inhibitor, lubricant, pigment or dye desired to modify the final product. After thorough mixing, the batch is aged for 6 to 24 hours to assure uniformity and to adjust to the temperature appropriate for the specific resin.

(b) The requisite amount of resin required for a casting is measured into a mixing container 1 having a pouring lip 2 such that the resin can be poured out as a film and having a removable partition 3 which may be inserted so as to divide the batch into two equal parts and so positioned and constructed that it permits separate simultaneous pouring of each part. The partition advantageously also extends across the pouring lip to prevent mixing of the two separate portions during flow over the lip. The required amount of catalyst for securing the desired gel time is added to the entire batch with vigorous agitation for a measured period of time. During this mixing period, the polymerization reaction is initiated, but the batch remains liquid.

(c) The batch is then divided into two equal portions by inserting the dividing partition 3. A separate mixer blade 4 is provided for each portion, and a suspension of a different colored pearlescent pigment is thoroughly mixed for a measured period of time in each portion simultaneously.

It is desirable that the individual colored pigments used in the separate portions are suspended in identical dispersion medium, inasmuch as it has been observed that the inhibiting or accelerating effect of the dispersion medium may vary. This can be made uniform by previously decanting the liquid dispersion medium from the settled pigments, mixing the liquid mediums, and reproportioning the liquid to the individual pigment types. The settled pigments are then redispersed in the separate liquid portions by moderate agitation.

(d) The two separately mixed portions of pigmented and catalyzed resins are simultaneously poured over the common partitioned pouring lip into the revolving horizontally-mounted casting drum. The pouring vessel is inserted into one end of the drum with the longitudinal axis of the pouring lip aligned with the axis of the drum. Two streams of resin are thus delivered separately but simultaneously onto axially spaced portions of the inner surface of the drum. By moving the pouring vessel axially through the revolving drum, two adjacent spiral strips of the two differently colored resin portions are applied over the entire inner surface of the drum. The rate of pouring is controlled so as to form a film of the liquid resin. One or more additional layers are then poured over the previously poured layer of resin portions in such manner as to optimize the superposition of one color portion over the other color portion in the drum so that the resulting composite sheet has the desired layered iridescent color effect of mother-of-pearl. By pouring in this manner, one layer of liquid resin is applied over the other layer of resin with a minimum of mixing of the different superimposed and adjacent portions. Thus, the mixing of the separately pigmented portions of the resin takes place primarily on the inner surface of the drum during pouring and leveling-out. During the pouring of the resin, the speed of rotation of the drum may vary considerably but must be at least sufficient to develop enough centrifugal force to hold the layers in substantially their position of deposition, except for the leveling-out flow necessary to produce a cast sheet of uniform thickness. Greater speed of rotation, on the other hand, makes possible the pouring of a greater number of layers in the time available before gelation commences. The temperature of the drum is advantageously so established prior to the pouring that it coincides with the temperature of the resin being poured so that it neither decelerates nor accelerates the rate of polymerization of the resin in the drum. The inner surface of the casting cylinder may be smooth or textured (as described in the aforementioned applications). The resulting orientation of the pearlescent pigment in the cast sheet resulting from the shearing action between the moving drum surface and the incoming fluid resin will therefore be substantially parallel to the contour of the inner surface of the casting cylinder, and the resulting casting will have a smooth sheen or a mottled appearance, depending upon the smooth or textured surface of the drum.

The finished material exhibits an iridescent color effect distributed evenly and smoothly over and throughout the entire mass, very much like that of natural mother-of-pearl. When thus cast into sheets, such material is particularly well suited for button blanks. Significantly, these button blanks can be machined from either side, thus making them ideal feed stock for automatic button-making machines. Regardless of whether flat or shaped buttons are to be fabricated, the iridescent color effect of natural mother-of-pearl will always be present.

The following examples are illustrative but not limitative of the practice of our invention.

*Example I*

A vessel maintained at 72° F. was charged with 165 lbs. of a rigid type unsaturated polyester resin (B.A.S.F.'s Palatal P6) and 55 lbs. of flexible unsaturated polyester resin (B.A.S.F.'s Palatal PE 210). To this charge, 70 gms. of a catalyst promoter (cobalt octoate containing 6% by weight cobalt) was added with agitation. In addition, 0.3 gm. of a thick paste of a compatible black pigment (Pittsburgh Plate Glass Corp.'s type 5524 Selectron black) was added to enhance the iridescence of the final product. The resulting master resin mixture was then homogenized at 72° F. for 4 hours.

A pouring vessel was then charged with 15.2 lbs. of this master resin mixture. The vessel was fitted with a removable partition and a wide pouring lip extending transversely across both sides of the partition. The resin was first agitated for a few minutes without the use of the partition, and then 175 gms. of methyl ethyl ketone peroxide were added as a catalyst with further agitation during which the temperature gradually rose in the course of about 6 minutes to about 80° F. The partition was then lowered into the vessel so as to divide it into two compartments and the mass into two separate batches of equal volume. The partition also extended along the center of the pouring lip. To each resin batch 105 g. of pearlescent pigment were added, one batch receiving red pearlescent pigment type BD and the other batch receiving green pearlescent pigment type BH, both batches having been treated as described hereinbefore to assure their uniformity in composition and proportion of liquid dispersing medium. The two batches were then individually agitated for one minute in their respective compartments so as to disperse the pearlescent pigment throughout the resin. The agitators were then removed and the vessel was moved into the interior of a rotating drum with the longitudinal axis of the vessel aligned with the horizontal axis of the drum. With the pouring vessel positioned adjacent one end of the drum, the vessel was tilted so that the material from the two compartments flowed together over the wide pouring lip provided at the rim of the vessel. The material was thus poured into a rotating drum while advancing the pouring vessel toward the other end of the drum. The pouring vessel was then rotated 180° about its vertical axis and the pouring operation was repeated so as to apply a second layer of the resin over the first layer with the green spiral of the second layer overlying the red spiral of the first layer. With continued rotation of the drum at a speed sufficient to hold the viscous plastic material in situ on the inner surface of the drum, the resin was polymerized for about half an hour, whereupon the self-coherent pliable sheet, about one-sixth inch thick, was removed from the drum and was punched into blanks. The blanks after standing for about 24 hours, had completely hardened and exhibited an iridescent color effect resemblying that of natural mother-of-pearl, the iridescence being distributed evenly and smoothly throughout the entire thickness of the sheet. The blanks produced therefrom were successfully made into buttons from either side, and the iridescent mother-of-pearl color effect was found to be preserved in both flat and shaped buttons.

*Example II*

The same procedure was followed as in Example I, except, however, that before homogenizing, a colorant composed of 450 ml. of a 1:100 solution of Ceresorange (Farbenfabriken Bayer) in styrene and 75 gms. of type 5524 Selectron black pigment (Pittsburgh Plate Glass Corp.) were incorporated into the polyester-resin master batch in addition to the cobalt catalyst promoter. This tinted stock mix had to be agitated for 8 minutes after the catalyst had been added before the temperature rose to 80° F. and the mass had the requisite degree of partial polymerization. Addition of the pearlescent pigments, blending and casting were then carried out as described in Example I. The blanks obtained were likewise about one-sixth inch thick, had an olive-green base color, and also exhibited the iridescent color effect of natural mother-of-pearl evenly throughout the entire blank.

*Example III*

The same procedure was followed as in Example I, except that the resin employed was an internally plasticized type resilient polyester (Interchemical Co. IC 1108). It was made into a master batch at 79° F. containing .06% cobalt octoate (6% cobalt) and .1% of polymerization inhibitor (Interchemical IC 335) to control the gel time. The batch was mixed with 2% by weight of methyl ethyl ketone peroxide, and after 3 minutes of mixing, when the temperature had risen to 81° F., the partition was inserted and 2.25% by weight of a red pearlescent pigment (Murano BDPE synthetic pearl of the Mearl Corp.) was added to one-half of the batch and 2.25% by weight of green pearlescent pigment (Murano BHPE) was added to the other half. The separate portions were individually but simultaneously mixed for one minute and were then poured into the drum using two passes over the entire area of the inside surface of the casting cylinder as in Example I. Total elapsed time was 6 minutes before pouring, and the resin gelled in about 5 minutes after pouring was completed. The resulting blanks were about one-eighth inch thick.

*Example IV*

The same procedure and formulation was followed as in Example III, except that the polyester resin employed was a rigid type resin (Allied Chemical & Dye Corp.'s Plaskon PE 205).

It will be readily appreciated that the method of our invention is applicable to the simultaneous pouring of more than two separately colored resin portions, that the separate pouring may be effected by other means than by a partitioned single pouring vessel, and that the thickness of the final sheet may be varied to suit any desired ultimate use by varying the total number of layers which are poured and the thickness of each of these layers.

We claim:
1. A method of producing pearly plastic material having an iridescent color effect which comprises blending a polymerizable liquid synthetic resin characterized by a controllable gel time with a polymerization catalyst, agitating the mixture until the polymerization reaction is initiated, dividing the resulting fluid mixture into a plurality of equal portions, admixing with each separate portion a single colored pearlescent pigment of different color, briefly agitating the individual pigment-containing portions, then separately but simultaneously pouring the individual pigment-containing portions into axially spaced portions of a rotating drum while advancing the pouring location from one end of the drum toward the other, at least once repeating the pouring of the separate resin portions in another layer thereof over the previously poured layer of resin portion with the successive layer of one color being substantially superimposed on a previous layer of the other color, the speed of the drum during said pouring steps being at least sufficient to develop enough centrifugal force to hold the poured layers in substantially their position of deposition, effecting polymerization of the resin while continuing rotation of the drum until the resin has set to a self-coherent state, and removing the resulting sheet of pigmented resin from the drum.

2. The method according to claim 1 in which the resin is a thermosetting resin.

3. The method according to claim 1 in which the resin is an unsaturated polyester.

4. The method according to claim 1 in which at least one of the separate resin portions which contains a colored pearlescent pigment further contains an additional colorant.

References Cited by the Examiner

UNITED STATES PATENTS

| | | | |
|---|---|---|---|
| 1,789,081 | 1/1931 | Payne | 264—245 XR |
| 2,170,931 | 8/1939 | Schafer | 264—311 XR |
| 2,856,635 | 10/1958 | Gerson et al. | 264—311 XR |

ROBERT F. WHITE, *Primary Examiner.*

ALEXANDER H. BRODMERKEL, *Examiner.*